US005855114A

United States Patent [19]
Runesson

[11] Patent Number: 5,855,114
[45] Date of Patent: Jan. 5, 1999

[54] ARRANGEMENT IN A PRESSING TOOL FOR SHEET METAL FORMING

[75] Inventor: Johan Runesson, Linkoping, Sweden

[73] Assignee: Stromsholmen AB, Tranas, Sweden

[21] Appl. No.: 952,606

[22] PCT Filed: May 15, 1996

[86] PCT No.: PCT/SE96/00647

§ 371 Date: Nov. 18, 1997

§ 102(e) Date: Nov. 18, 1997

[87] PCT Pub. No.: WO96/36814

PCT Pub. Date: Nov. 21, 1996

[30] Foreign Application Priority Data

May 19, 1995 [SE] Sweden .................................. 9501880

[51] Int. Cl.[6] ...................................................... F16D 31/02
[52] U.S. Cl. ................................................................ 60/413
[58] Field of Search ....................................... 60/325, 413

[56] References Cited

U.S. PATENT DOCUMENTS

| | | | |
|---|---|---|---|
| 2,420,890 | 5/1947 | MacDuff . | |
| 4,209,987 | 7/1980 | Kononov et al. | 60/413 |
| 4,211,078 | 7/1980 | Bass | 60/413 |
| 4,253,379 | 3/1981 | Olson . | |
| 4,959,957 | 10/1990 | Schmale et al. | 60/413 |
| 5,038,598 | 8/1991 | Pitzer . | |
| 5,361,583 | 11/1994 | Huitema | 60/413 |

*Primary Examiner*—Hoang Nguyen
*Attorney, Agent, or Firm*—Merchant, Gould, Smith, Edell, Welter & Schmidt, P.A.

[57] ABSTRACT

Arrangement in a pressing tool for sheet metal forming in order to shut off or retard an oil flow in a hydraulic system at an arbitrarily chosen time in coordination with the closing and opening movements of the said tool. When the tool closes, a non-return valve (6) permits a flow in one direction from a primary hydraulic cylinder/piston unit (7), which is thereby compressed, to an accumulator (8). A first valve (9) selectively permits a flow between the accumulator (8) and a secondary hydraulic cylinder/piston unit (10) which, in the event of such a flow, passes from a compressed basic position to an expanded position. Parallel with the non-return valve (6) is a second valve (11) which, when the primary hydraulic cylinder/piston unit (7) has been relieved by opening of the tool, will selectively permit a return flow to the primary hydraulic cylinder/piston unit (7) from the accumulator (8) or, if the first valve (9) is also opened, from the secondary hydraulic cylinder/piston unit (10), which is designed to be then returned to the compressed basic position.

9 Claims, 1 Drawing Sheet

ARRANGEMENT IN A PRESSING TOOL FOR SHEET METAL FORMING

The present invention relates to an arrangement in a pressing tool for sheet metal forming in order to shut off or retard an oil flow in a hydraulic system in coordination with the closing and opening movements of the said tool.

In sheet metal forming operations, for example, it is usual to arrange a passive hydraulic system in the pressing tool. This is done in order to be able to shift some of the pressing force to another position and another direction, for example in order to be able to perform yet another operation in the same tool. Such a system can be achieved by arranging a primary hydraulic cylinder/piston unit in a lower tool half in such a way that the piston is pressed into the cylinder when the tool is closed. The oil flow from the primary hydraulic cylinder/piston unit can thus be used in order to produce a stroke in a secondary hydraulic cylinder/piston unit. The timing of the said stroke coincides with the closing of the tool.

In certain cases it is desirable to be able to freely determine the point in time at which the secondary force/movement is to act. Where a passive system of the above-mentioned type is used it is therefore desirable to be able to retard the oil flow between the primary and the secondary hydraulic cylinder/piston unit. Such a retardation is already known. This retardation is achieved by allowing a primary hydraulic cylinder/piston unit arranged in a lower tool half of a pressing tool to act in opposition to a gas-filled spring arranged in an upper tool half. A valve is arranged and designed to selectively permit a flow between the primary and the secondary hydraulic cylinder/piston unit. By keeping the valve closed when the tool is closing, the gas-filled spring in the upper part of the sheet metal forming tool is compressed against the piston rod of the hydraulic cylinder/piston unit. The said piston rod is not pressed into the cylinder when the tool is being closed, but only when the valve is opened after predetermined delay. The gas-filled spring then presses the piston rod into the cylinder so that the oil flows from the latter to the secondary hydraulic cylinder/piston unit, which can then supply force and movement. One limitation to the solution described is that the pressing tool must be in the fully closed position in order to be able to supply a satisfactory oil flow. This means that the time at which the secondary force/movement will act cannot be determined with complete freedom.

The object of the present invention is to produce an arrangement which can shut off or retard an oil flow in a hydraulic system in a pressing tool for sheet metal forming for an arbitrarily chosen period. This object is achieved according to the invention in that it comprises: a non-return return valve designed, when the tool is being closed, to permit a flow in one direction from a primary hydraulic cylinder/piston unit, which is thereby compressed, to a pressurised accumulator; a first valve designed to selectively permit a flow between the accumulator and a secondary hydraulic cylinder/piston unit, which is designed as a consequence of such a flow to move from a compressed basic position to an expanded position; and parallel with the non-return valve a second valve, designed so that when the primary hydraulic cylinder/piston unit has been relieved by opening of the tool, it will selectively permit a return flow to the primary hydraulic cylinder/piston unit from the accumulator or, if the first valve is also made to open, from the secondary hydraulic cylinder/piston unit, which is designed to be then returned to the compressed basic position, and wherein the accumulator is of dimensions sufficient to accommodate the oil which is in the system when both the hydraulic cylinder/piston units are compressed.

According to a special characteristic of the invention, the pressure in the accumulator is always equal to or greater than the working pressure in the hydraulic system.

According to a further special characteristic of the invention, a piston which separates the oil from pressure generating means is located in the accumulator.

According to a further special characteristic of the invention, gas is used as the pressure generating means.

According to a further special characteristic of the invention, a coil spring is used as pressure generating means.

According to a further special characteristic of the invention, the secondary hydraulic cylinder/piston unit is designed to be returned to the compressed basic position by means of a gas-filled spring.

According to a further special characteristic of the invention, the secondary hydraulic cylinder/piston unit is designed to be returned to the compressed basic position by means of a coil spring.

According to a further special characteristic of the invention, the secondary hydraulic cylinder/piston unit is designed to be returned to the compressed basic position by means of a gas under pressure.

According to a final special characteristic of the invention, the piston in the accumulator is designed to rest against a stop when the system is not under load.

The prior art and a preferred embodiment of the invention will be further explained below with reference to the drawing enclosed, in which.

Figure 1:
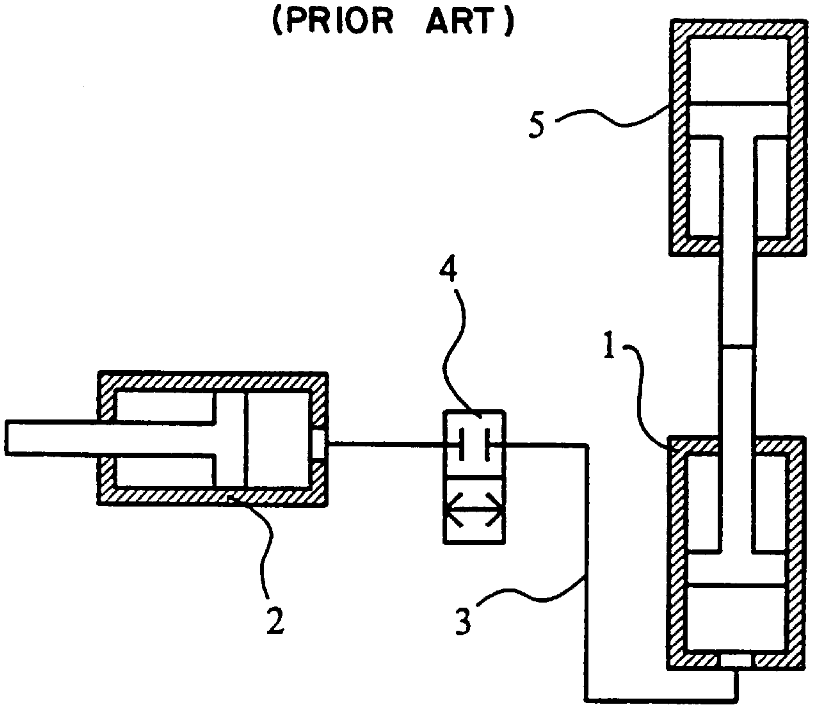
Fig. 1 (PRIOR ART)
FIG. 1 shows a passive hydraulic system with a retarding arrangement according to the prior art.

In FIG. 1, 1 denotes a primary hydraulic cylinder/piston unit arranged in a lower tool half of a pressing tool for sheet metal forming. The primary hydraulic cylinder/piston unit 1 forms a passive system together with a secondary hydraulic cylinder/piston unit 2 and a flow element 3 connecting the cylinders. The passive system derives its driving force from an external action on the piston rod of the primary hydraulic cylinder/piston unit 1. The main function of the system is to convert a force in one direction at one point to a force in another direction at another point. The flow element 3 is provided with a valve 4, which is designed to selectively permit a flow between the primary and the secondary hydraulic cylinder/piston unit.

The retardation of the oil flow is achieved by means of the valve 4 and a gas-filled spring 5, which is arranged in the upper part of the pressing tool and designed to act in opposition to the piston rod of the primary hydraulic cylinder/piston unit 1 when the tool is being closed. The valve 4 is kept closed when the tool is closing, for which reason the gas-filled spring 5 is compressed against the piston rod of the primary hydraulic cylinder/piston unit 1, which remains in an extended position. When the tool is closed, the valve 4 is made to open at an arbitrary time, following which the piston rod of the gas-filled spring 5 presses the piston rod of the primary hydraulic cylinder/piston unit 1 in and oil flows from the latter to the secondary hydraulic cylinder/piston unit 2 so that its piston rod moves outwards. In order for this to function satisfactorily, the tool must be fully closed when the valve 4 is being opened.

Figure 2:
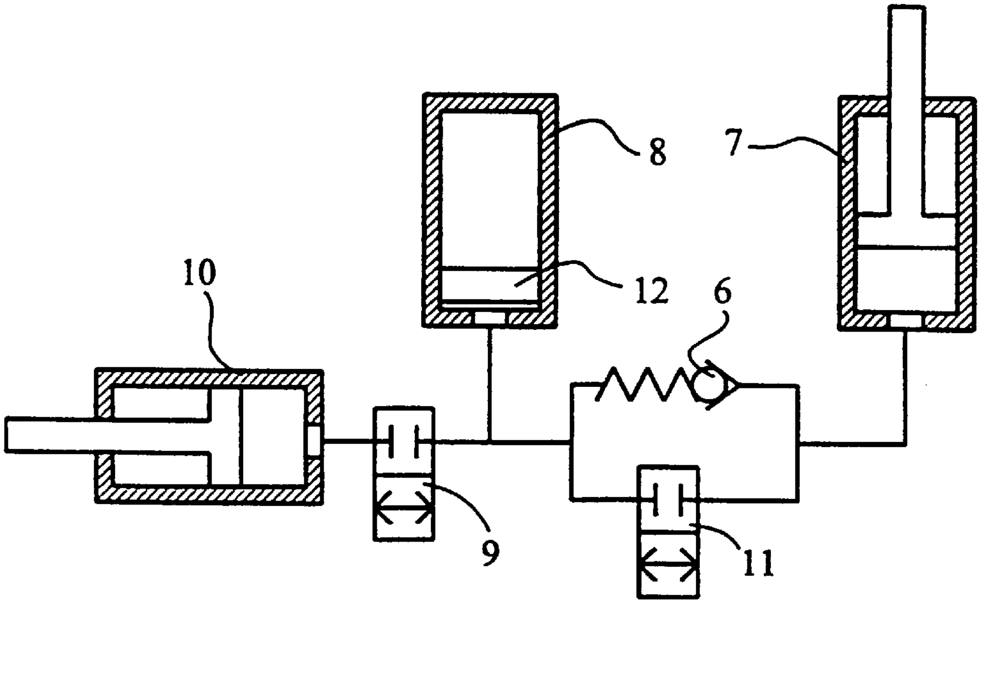
FIG. 2 shows a passive hydraulic system with a retarding arrangement according to the invention.

FIG. 2 shows an arrangement according to the invention for shutting off or retarding of an oil flow in a hydraulic system. In this embodiment the hydraulic system is a passive system of the same type as in FIG. 1. A primary hydraulic system/piston unit 7 is arranged in a lower tool half of a pressing tool for sheet metal forming and connected to a primary flow connection of the retarding arrangement. A secondary hydraulic cylinder/piston unit 10 is connected to a secondary flow connection of the retarding arrangement and designed to perform another operation in the same tool. A non-return valve 6 is designed to permit a flow in one direction from the primary flow connection to a pressurised accumulator 8, for example a piston accumulator. A first two way valve 9 is designed to selectively permit a flow between the accumulator 8 and the secondary flow connection. This can occur at any time after the tool is closed and also after it is opened again. A second two-way valve 11 is arranged parallel with the non-return valve 6 and designed to selectively permit a return flow to the primary flow connection after a certain time or as a function of the position of the piston rod of the secondary hydraulic cylinder/piston unit 10. The secondary hydraulic cylinder/piston unit 10 has a built-in return force which can be achieved by means of a gas-filled or coil spring.

When the halves of the sheet metal forming tool are closed, the piston rod of the primary hydraulic cylinder/piston unit 7 is pressed into the cylinder. The oil flows from the latter in through the primary flow connection. Since the second two-way valve 11 is normally closed at this time, the oil flow passes the non-return valve 6 and continues to the pressurised accumulator 8. The oil is forced into the accumulator 8, in which there is a piston 12 which separates the oil from pressure-generating means. Gas-filled or coil springs, for example, may serve as pressure-generating means. The piston 12 is pressed away by the oil which is pressurised by the piston 12. The pressure in the accumulator 8 is equal to or greater than the working pressure in the hydraulic system. As long as the second two-way valve 11 or the first two-way valve 9 respectively is kept closed, the oil flow through them can be shut off or retarded in the accumulator 8.

When force is required from the secondary hydraulic cylinder/piston unit 10, the first two-way valve 9 can be opened so as to permit a flow between the accumulator 8 and the secondary hydraulic cylinder/piston unit 10. Its piston rod is made to move outwards as oil is forced in by the piston 12 of the accumulator 8. The accumulator 8 also functions as overload protection in case the piston rod is subjected to a required or unwanted stop. This is possible in that it is designed to accommodate the oil which is present in the system when the piston rods of both hydraulic cylinder/piston units 7, 10 are pressed into the cylinders. In such cases the accumulator 8 takes up the excess oil in the system so that an undesirable pressure increase cannot occur. When the secondary hydraulic cylinder/piston unit 10 has performed its stroke and the primary hydraulic cylinder/piston unit 7 is relieved, the system can be made to return to its basic position. Relief is often effected by opening the tool again immediately after closing it. This return stroke can be effected by the secondary hydraulic cylinder/piston unit 10, which is provided with a return force, forcing the oil back to the primary hydraulic cylinder/piston unit 10. The return flow can occur after the second two-way valve 11 has also been opened. The system is thereby again ready for a new forming operation.

The system according to the invention can also be adapted to a situation in which strokes by the secondary hydraulic cylinder/piston unit 10 are not desirable. In this situation oil, as previously described, is discharged from the primary hydraulic cylinder/piston unit through the non-return valve 6 to the accumulator 8. Oil is then quite simply discharged back to the relieved primary hydraulic cylinder/piston unit 7 by opening of the second valve 11 after the tool has been opened. The first two-way valve 9 is kept closed throughout the entire process. In this way a shutting-off of the secondary hydraulic cylinder/piston unit 10 is achieved.

The piston 12 in the accumulator 8 can be designed to rest against a stop when the system is not under load. This means that the pressure in the unloaded system is zero in all parts outside the accumulator 8. The accumulator 8 can also consist of a spring-loaded piston rod in a hydraulic cylinder/piston unit.

Although the invention has been described in relation to sheet-metal forming equipment, it can be applied in any hydraulic system where there is a need for retardation.

The invention is obviously not limited to the embodiment described above by way of an example, but lends its self to modifications within the scope of the idea of the invention defined in the claims below.

I claim:

1. Arrangement in a pressing tool for sheet-metal forming in order to shut off or retard an oil flow in a hydraulic system in co-ordination with the closing and opening movements of the said tool, characterised in that it comprises a non-return valve (6) designed, when the tool is being closed, to permit a flow in one direction from a primary hydraulic cylinder/piston unit (7), which is thereby compressed, to a pressurised accumulator (8); a first valve (9) designed to selectively permit a flow between the accumulator (8) and a secondary hydraulic cylinder/piston unit (10), which is designed as a consequence of such a flow to move from a compressed basic position to an expanded position; and parallel with the non-return valve (6) a second valve (11), designed so that when the primary hydraulic cylinder/piston unit (7) has been relieved by opening of the tool, it will selectively permit a return flow to the primary hydraulic cylinder/piston unit (7) from the accumulator (8) or, if the first valve (9) is also made to open, from the secondary hydraulic cylinder/piston unit (10), which is designed to be then returned to the compressed basic position, and wherein the accumulator (8) is of dimensions sufficient to accommodate the oil which is in the system when both the hydraulic cylinder/piston units are compressed.

2. Arrangement according to claim 1, characterised in that the pressure in the accumulator (8) is always equal to or greater than the working pressure in the hydraulic system.

3. Arrangement according to claim 2, characterised in that a piston (12) which separates the oil from pressure generating means is located in the accumulator (8).

4. Arrangement according to claim 3, characterised in that gas is used as the pressure generating means.

5. Arrangement according to claim 3, characterised in that a coil spring is used as pressure generating means.

6. Arrangement according to any of claims 1, characterised in that the secondary hydraulic cylinder/piston unit (10) is designed to be returned to the compressed basic position by means of a gas-filled spring.

7. Arrangement according to any of claims 1, characterised in that the secondary hydraulic cylinder/piston unit (10) is designed to be returned to the compressed basic position by means of a coil spring.

8. Arrangement according to any of claims 1, characterised in that the secondary hydraulic cylinder/piston unit (10) is designed to be returned to the compressed basic position by means of a gas under pressure.

9. Arrangement according to claim 1, characterised in that the piston (12) in the accumulator (8) is designed to rest against a stop when the system is not under load.

* * * * *